March 29, 1927.
A. WALLACE
1,622,554
ADJUSTABLE MIRROR SUPPORT
Filed Nov. 27, 1923
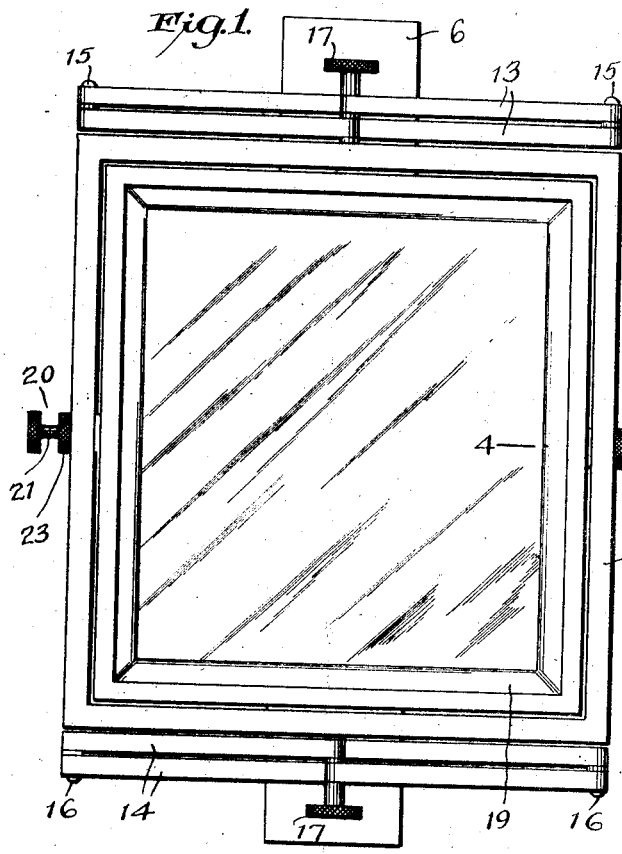
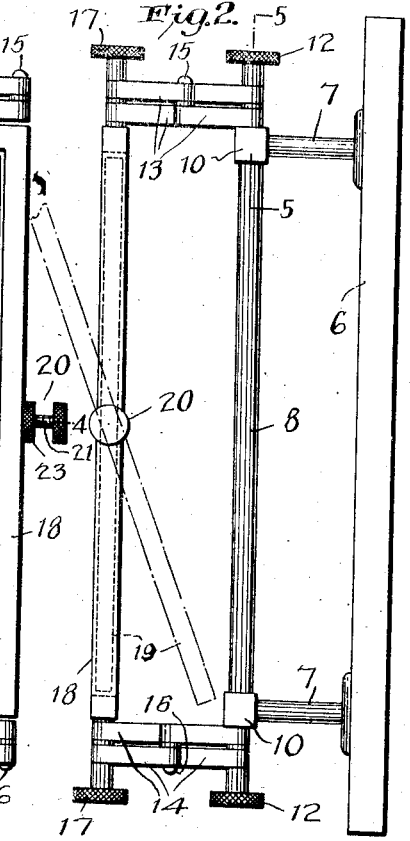
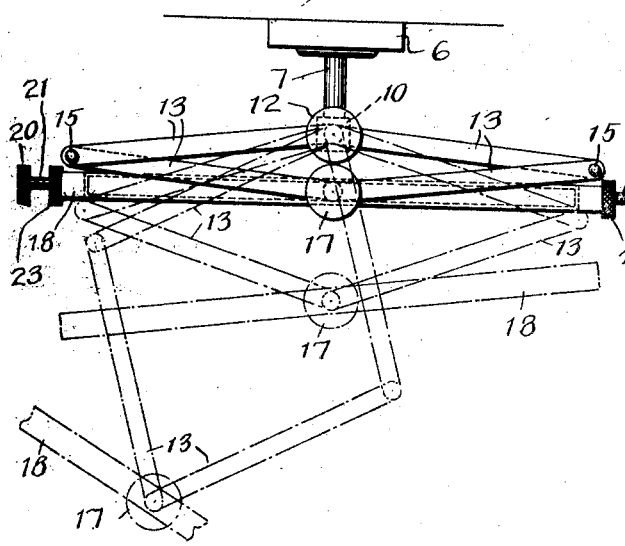
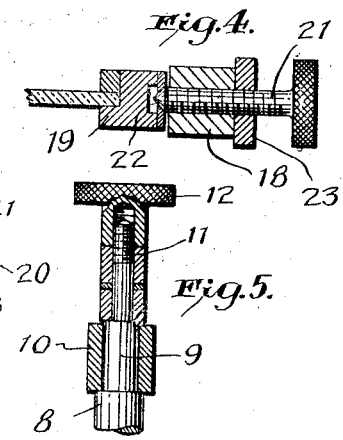
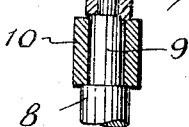
INVENTOR
Alexander Wallace,
BY
ATTORNEY Patented Mar. 29, 1927.

1,622,554

UNITED STATES PATENT OFFICE.

ALEXANDER WALLACE, OF NEW ROCHELLE, NEW YORK.

ADJUSTABLE MIRROR SUPPORT.

Application filed November 27, 1923. Serial No. 677,257.

This invention relates to universally adjustable supports and it has for its object to provide an efficient, compact construction of attractive appearance which can be manufactured at a low cost with a minimum of operations, assembled quickly and easily, and manipulated without difficulty when in use.

I am aware of the numerous patents which have been issued upon devices of this nature, but have devised herewith a structure with a wider scope, possessing features not hitherto known or disclosed.

It is important in articles of this character that the various parts should be of light weight but at the same time possessed of sufficient rigidity and strength to stand the strains of use and also to permit of joints and connections being made so that all the movements of the structure are smoothly effected without any conflict between the moving parts.

These objects are attained in the structure shown in the drawings herewith in which:—

Fig. 1 is a front elevation.

Fig. 2 is a side view with the mirror shown in dash and dot lines, and swung at an angle.

Fig. 3 is a plan view with the moving parts shown in dash and dot lines and in two different positions.

Fig. 4 is a fragmentary detail sectional view of the trunnion for the mirror and taken on the line 4—4 of Fig. 1.

Fig. 5 is a fragmentary detail sectional view taken on line 5—5 of Fig. 2.

In the drawings, 6 indicates a wall support or the like to which one end of the flanged studs 7 may be attached in any suitable manner, the other end 10 of the said studs being squared and bored to receive the portions 9 of the supporting rod 8.

As shown in Fig. 5 the rod 8 while integral, is turned down slightly where it is enclosed by the squared end 10, and is also still further reduced in diameter at its extremities which are threaded for engagement with the knurled nuts 12, which serve to regulate the tension and tighten or loosen the relations between the squared portions 10 on the rods 8 and the ends of the jointed levers 13 at the upper end, and the ends of the levers 14 at the lower end. The upper levers 13 are pivoted at 15 and the lower levers 14 are pivoted at 16, and their outer ends are positioned and secured to the mirror frame 18 by the knurled nuts 17.

The mirror 19 is pivotally mounted at 20 in the frame 18 the screw 21 having pivot bearings 22 and the lock washer 23 by means of which the mirror may be securely held at any desired angle.

It will be seen from the above disclosure that the mirror can be adjusted for use at practically every angle and at any distance from the wall within the limits of the length of the extended jointed levers.

I claim:—

In an adjustable mirror, the combination with a support, of a mirror frame, a mirror, horizontal trunnions supporting the mirror in the mirror frame, upper and lower centrally disposed studs secured to the support and each provided with an enlarged head having an opening therethrough, upper and lower pairs of intermediately hinged levers the forward ends of each upper and lower pair extending respectively to the top and bottom of the mirror frame, nuts pivotally connecting such forward ends of the levers to the mirror frame, and the rear ends of the upper and lower pairs of levers extending respectively above and below the enlarged ends of the studs, a vertical rod extending through the rear ends of the levers and through the openings in the enlarged ends of the studs, said rod having reduced threaded ends, and nuts threaded thereonto.

ALEXANDER WALLACE.